Patented July 25, 1950

2,516,634

UNITED STATES PATENT OFFICE 2,516,634

COLD-WATER SWELLING STARCH ETHERS IN ORIGINAL GRANULE FORM

Carl C. Kesler and Erling T. Hjermstad, Cedar Rapids, Iowa, assignors to Penick & Ford, Ltd., Incorporated, Cedar Rapids, Iowa, a corporation of Delaware No Drawing. Application August 13, 1947, Serial No. 768,488

26 Claims. (Cl. 260—209)

This invention relates to an improved process of manufacturing partially etherified carbohydrates, and is more particularly concerned with the partial etherification of starch in its original granule form and with dextrinized starch. The present invention constitutes a continuation in part of our co-pending applications, Serial No. 688,976, filed August 7, 1946, and No. 740,718, filed April 10, 1947, entitled Starch Ethers in Original Granule Form and Preparation of Starch Ethers in Original Granule Form, respectively.

It has been known for many years that alkylene oxides, particularly ethylene and propylene oxide, will react with carbohydrates to form hydroxyalkyl ether derivatives. The usual practice is to treat the carbohydrate material with an excess of strong alkali, such as concentrated aqueous solutions of sodium or potassium hydroxide, before or during the reaction with alkylene oxides. This type of process is best adapted to the treatment of cellulose. When starch is treated in this manner, its granules swell and rupture by the action of the strong alkali and depending on the amount of water present, either a paste or a doughy, plastic mass is formed. Upon reaction of these starch-alkali mixtures with alkylene oxides under different conditions a variety of products are obtained which are described in a number of different ways. Some investigators report doughy, sticky, translucent masses, some produced hard, glassy products, one produced an opaque mass having the consistency of honey or soft resin, while still others reported dark, yellow powders. In all of these products the granule structure of the starch has been either destroyed or irreversibly changed. These products require various special processing operations which are time-consuming and costly, for example, dialysis of excess alkali from solutions of the reaction product, neutralization of excess alkali with acetic acid and extraction of the sodium acetate by ethyl alcohol, extraction of the reaction product with alcohol, benzol, or other organic solvents, dissolving the reaction product in 40% alcohol and concentrating, precipitation of the reaction product with ether, evaporation of solutions of the product to dryness, and grinding of the product after drying. These products cannot be washed, dewatered or filtered, and dried by the ordinary methods and equipment used for producing commercial starches and starch modifications. Due to the difficulty, time required, and special equipment required for purifying these reaction products and also to the use of relatively costly organic solvents in some cases, the hydroxy-alkyl derivatives of the starches made by these methods have not been produced on a commercial scale, since the cost of manufacturing such products outweighs their commercial usefulness.

Some evidence has been published to the effect that dry commercial starches may be reacted directly with large amounts of alkylene oxides without first swelling or dispersing the starch with strong alkali. German Patents No. 368,413 and No. 363,192 describe the treatment of dry starch or cellulose with amounts of ethylene oxide from 10% to 3000% by weight on the starch with the production of materials which are described as being either starch-like or plastic, rubbery, or glassy masses. These specifications recommend the use of a large excess of alkylene oxide to promote the reaction and subsequent distillation of the unreacted agent from the reaction product. The fact that a large amount of the alkylene oxide used in the process described is wasted is evident from the statement that the soluble, oily constituent formed may be extracted with alcohol or other organic solvents. The conditions of elevated temperature and pressure, and excess of alkylene oxide, favor the formation of soluble, oily materials from the alkylene oxide. Hydroxyalkyl ether derivatives of starch which have a tendency to swell in cold water can be made by the process described in these specifications but due to the inefficiency of the reaction the products are too costly to be of commercial importance.

While starch products having no tendency to swell in cold water can be easily made by reacting very small amounts of alkylene oxides, for example 1% to 5% by weight of ethylene or propylene oxide, based on the starch, with dry commercial starches as described in our co-pending application Serial No. 688,976 the combination of amounts of alkylene oxide sufficient to produce cold water swelling characteristics is not feasible by this process. Very long periods of time are necessary if larger amounts of ethylene oxide are reacted directly with commercial starch at moderate temperatures and the reaction rate of propylene oxide and higher homologs is much slower. The reaction of sufficient propylene oxide with dry, granule commercial starch to produce cold-water swelling tendencies is extremely difficult. By raising the temperature and pressure or using a large excess of reagent the rate of reaction is increased somewhat but this also results in the formation of greater quantities of side reaction products, usually oily or greasy in nature which are difficult and costly to remove from the starch and which represent a substantial waste of etherifying agent.

We have discovered that the efficiency and rate of reaction of larger amounts of alkylene oxides with 10% moisture granule starch is greatly increased by incorporating in the starch granules before reaction a small amount of a salt which will react with alkylene oxides in the presence of water to produce alkali. The efficiency of the reaction is increased to such an extent that it is possible to react with the starch large enough amounts of alkylene oxides, such as ethylene and propylene oxide, to produce products having the original granule structure unchanged contain negligible side reaction products, and which will swell completely in cold water.

A small amount of soluble alkali may also be used. However, the proportion of soluble alkali which may be incorporated in starch granules without irreversibly altering the physical characteristics of the starch is very small. Soluble alkali, such as sodium or potassium hydroxide may be added to a starch-water suspension without swelling the starch granules provided the concentration of alkali is maintained below a certain critical value. This value depends on several factors, for example, the kind of starch, the degree or type of modification of the starch, the kind of alkali used, the ratio of water to starch in the suspension, the temperature of the suspension, the presence or absence of substances which inhibit the swelling of starch, and the length of time the suspension is maintained in an alkaline condition. Dewatering and drying of starch suspensions containing soluble alkali is feasible only if very small proportions of alkali are present. Slightly swollen starch granules in suspension greatly retard the removal of water during the dewatering or filtering operation. After dewatering, commercial starches are ordinarily dried with heat. The presence of soluble alkali above a critical value will cause the starch to become darker in color or brown during the drying operation. This value also depends on several factors, for example, the kind of starch or degree of modification, the kind of alkali, the temperature, and the length of time involved in drying. Due to the above mentioned difficulties, it is not possible to incorporate sufficient soluble alkali in starch granules to promote the desired reaction in many of the variations of our present process. The incorporation of a salt in starch granules does not present these difficulties, however. Salts such as sodium chloride or sodium sulfate may be easily dissolved in starch suspensions and do not have a tendency to swell the granules or cause browning of the starch when it is dried at elevated temperatures. These salts act as latent alkaline catalysts in our present process. When an alkylene oxide is brought into contact with starch granules containing the salt and approximately 10% by weight of moisture it reacts with the salt to liberate alkali. The amount of alkali liberated is sufficient to promote an efficient reaction between the starch and enough alkylene oxide to produce a product with unswollen granules and negligible side reaction products and which will swell completely in cold water.

The amount of alkali present or liberated during the reaction must be less than that which would swell or change the granule structure of the starch. Starches which contain approximately 10% by weight of moisture and salt or alkali in amount insufficient to cause swelling of the granules will react readily with alkylene oxides such as ethylene and propylene oxide to form products which retain the dry, unswollen, granule form, are not colored, are not soluble in organic solvents, but which will swell completely in cold water to form a smooth, viscid, colorless, and relatively clear paste.

The amount of alkylene oxide combined with the starch may be so limited to produce a product which will swell in water at any desired temperature between the normal gelatinization temperature of the starch and the freezing temperature of water. The amount of lowering of the gelatinization temperature of unmodified corn starch by reacting with varying proportions of ethylene oxide is illustrated in the following table. Unmodified corn starch containing 1% by weight of sodium chloride incorporated in the granules was reacted with from 2 to 14% by weight of ethylene oxide. The reacted products were suspended in cold water in a 5% dry basis concentration, neutralized, and their swelling temperatures determined by means of a Corn Industries Viscometer. A description of this instrument and method of determining gelatinization temperature ranges of starches is given in the Journal of Industrial and Engineering Chemistry, Analytical Edition, vol. 19: pp. 16–21; 1947. The cold water suspensions of the ethylene oxide reacted starches were placed in the viscometer and the temperature raised to the swelling temperature of ordinary corn starch over a period of approximately ½ hour. The temperature at which a substantial increase in viscosity occurred was recorded as the swelling temperature of the sample.

TABLE

Swelling temperatures of corn starch reacted with varying proportions of ethylene oxide

| Per cent by weight of ethylene oxide reacted with starch | Swelling Temperature |
|---|---|
| | °F. |
| none | 176 |
| 2 | 163.2 |
| 4 | 132.8 |
| 6 | 120.2 |
| 8 | 106.7 |
| 10 | 96.8 |
| 12 | 82.4 |
| 14 | 75.0 |

The partially etherified starches made by our improved process contain negligible side reaction products, even though amounts of ethylene or propylene oxide sufficient to produce cold water swelling characteristics have been reacted with the starch. The product remains in its original, dry granule form throughout the reaction and on completion of the reaction may be stored, packed in shipping containers, or used without any further processing operations. It needs no further purification or extraction. Our product is intended to have the natural form and physical properties of commercial starches and, in addition, lowered gelatinization temperature range and absence of retrogradation and gelling tendencies.

Products can be readily made by our process which will gelatinize in cold water which is either acidic, neutral, or alkaline, and will swell at any dilution. This product swells completely in cold water, that is, there are substantially no unswollen granules or aggregates of granules which remain unswollen.

Broadly, our process consists of directly reacting an alkylene oxide with ordinary commercial starches containing around 10% by weight of moisture and a small amount of salt or soluble alkali or both incorporated in the granules. The amount of salt or alkali may be varied. We prefer to use less than 0.5% by weight of sodium hydroxide and less than 5% by weight of sodium chloride. The amount of alkali or salt necessary depends on the extent to which free hydroxyl ions are liberated during the reaction. In some cases larger amounts of salt or alkali are feasible, depending on the type of starch being reacted, the conditions of temperature and moisture content, and on the amount and kind of alkylene oxide used for etherifying. We prefer to incorporate the salt or alkali in the starch granules by dissolving in the starch-water suspension before the starch is dewatered and dried in the normal process of manufacturing commercial starches. In all cases the amount of salt or alkali mixed with the starch is necessarily limited to amounts which will not cause swelling of the starch during reaction with alkylene oxides or which would make dewatering of the starch-water suspension difficult. During the process of manufacturing certain ordinary starch modifications, such as acid-modified thin-boiling starches, a certain amount of salt is produced during neutralization. This salt is normally removed by washing and discarded. This salt of neutralization may be used as part of the salt requirements for the present process of reacting starch with alkylene oxides, thus affording still greater economy in the production of these derivatives.

The salt or alkali may also be reduced to a fine powder and blended with dry starches or dextrins before reaction with alkylene oxides. The uniformity of the reaction with alkylene oxides depends on the uniformity of dispersion of the salt or alkali in the starch.

The temperature and pressure employed in the process may vary widely. The reaction may be carried on at from below ordinary or room temperature up to the decomposition temperature range of the starch and the pressure may be above or below that of the atmosphere.

Any granule starch may be employed. The term "granule" is intended to describe starches which still have their original granule structure intact, even though they may have been subsequently modified in many respects. All starches are produced in plants in the form of granules having a characteristic shape and size. During the normal processes of preparing commercial starches these granules are not altered physically. The granule structure is retained even during such treatments as modifying by means of acids or oxidizing agents or during the process of converting starch to dextrins and gums. Granule starches therefore include unmodified starches, acid modified thin boiling starches, oxidized starches, British gums, dextrins, and substantially all of the common commercial starches, which exist or are produced in their original granule form. We also include the different varieties of starch, such as corn starch, potato starch, wheat starch, rice starch, waxy maize starch, tapioca starch, whether modified or unmodified, which exist or are produced in their original granule form. We find that all such starches respond to the present process and bring about the results described.

The term alkylene oxides includes those compounds which contain the ethylene oxide structure, as illustrated by the skeleton formula

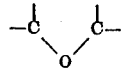

Included therefore are ethylene oxide, which has the structural formula

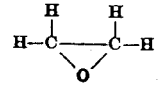

and propylene oxide which has the structurtal formula

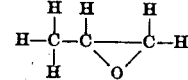

The term salt as used in this specification includes those salts which will react with an alkylene oxide in the presence of water to liberate free hydroxyl ions. Some examples of such salts are sodium chloride, potassium chloride, sodium sulfate, potassium sulfate, calcium chloride, etc. The term alkali includes those alkalis which liberate free hydroxyl ions in the presence of water.

During the reaction of the dry starch with alkylene oxide, we prefer to admit the gaseous or liquid reagent gradually or in small, regular increments. In this way we may avoid high pressures and a large amount of unreacted alkylene oxide present in the reaction chamber at any given time. It is known that alkylene oxides, especially ethylene oxide, may undergo dangerous exothermic polymerization under conditions of high pressure, elevated temperatures, and in the presence of inorganic alkalis. By maintaining only a very slight excess of unreacted oxide in the reaction chamber at any given time we may thus avoid the danger of an explosion and also decrease the tendency of the unreacted alkylene oxide to undergo side reactions.

We prefer to react starches containing the normal or commercial moisture, that is, from 5 to 15% by weight. The reaction will take place at higher or lower moisture contents. The reaction is less rapid at lower moisture contents while at higher moisture contents there would be a tendency for the starch granules to swell as their gelatinization range is lowered during the reaction.

After reaction with alkylene oxides the product may be neutralized with acidic materials or left in an alkaline condition. The degree or extent of etherification may be varied in accordance with the desired characteristics of the finished product. We prefer that the starch react with less than 20% by weight of ethylene oxide. The amount of alkylene oxide to be reacted is governed by the amount of lowering of the gelatinization range of the starch which is desired. For example, we have found that 16% by weight of ethylene oxide reacted with an unmodified corn starch will produce a starch which will swell to a viscid, relatively clear paste within 5 minutes when placed in water at a temperature of 80° F. Starches can be produced which will swell or gelatinize instantly in water at ordinary or room temperatures, or they may be made so that they require longer periods of time for complete swelling. A starch which will completely swell in 5 minutes is more valuable for many purposes than one which swells instantly, since the former would disperse in water readily before swelling, while the latter would tend to form aggregates of ungelatinized granules covered with a film of gelatinized starch, which would be difficult to disperse. The concentration of starch in a water suspension also has an effect on the rate of swelling.

Numerous attempts have been made in the past to produce a cold-water pasting starch which retains the best characteristics of the original starch from which it is made. We have no knowledge of such a product other than that produced by the present method of treatment with an alkylene oxide. Pregelatinized starches, made by heating wet starch until gelatinized and dried and subsequently grinding to a powder, have certain undesirable properties, such as partial retrogradation and the resultant tendency of part of the starch to remain undispersed when put in water opaqueness and coarseness of paste, and loss of adhesive power. Chemical and thermal degradation of starch may lower gelatinization temperatures, but at the same time the viscosity of the paste is greatly decreased. The use of chemical agents such as strong alkali, inorganic thiocyanates, formaldehyde, etc., to promote swelling of starches in cold water is either very costly or results in the introduction of undesirable ions in the paste, and necessitates pasting in a limited volume of water to be effective. The product we describe, however, has none of the above mentioned disadvantages.

The lowered gelatinization temperature range and the inhibiting of the tendency of cereal starches to form gels when cooled after cooking suggests numerous industrial applications for this product. One of the serious disadvantages of cereal starches for many uses is the tendency of their pastes to set-back or retrograde. The glutinous starches, such as tapioca, which do not have this characteristic to such a marked degree have long been considered the best basis for the preparation of adhesives. Also, the tacky or "long" character of the pastes formed from the glutinous starches has been considered a valuable property in adhesives. For many purposes, such as in veneer glues, the adhesive must possess the ability to flow at relatively high concentrations. Ordinary cereal starches and many of their modifications tend to set-up or gel in high concentrations or lack the necessary flow properties. The treatment of cereal starches with alklyene oxides improves them considerably in this respect.

The products obtained by our present process may be further modified by methods common in the starch industry. Starches can be so reacted with alkylene oxides that when subsequently dextrinized by methods common in the starch industry give improved types of dextrins which when cooked have better flow characteristics and reduced tendency to set-back or stiffen upon ageing.

An ethylene oxide reacted corn starch functions efficiently as a laundry finish, when the dry product is added directly to 100° F. water in the wheel of a commercial laundering machine, tumbling the clothes in the water for several minutes, extracting the excess water, and then ironing. A firm, flexible, finish is produced on shirts, without streaks or shine. Cold water swelling starches produced by our process also are useful as home laundry starches, as they can be stirred with cold water to a stable, relatively clear, smooth paste which will not gel on standing. Boiling the starch and maintaining elevated temperatures are therefore avoided.

The cold water swelling alkylene oxide reacted starches may be used as thickeners in various commercial applications, for example, well drilling fluids and textile printing pastes. These starches are also excellent adhesives and may be used without cooking or heating in water at elevated temperatures.

The treatment of dextrins by our present process improves them considerably in many respects. Ordinary dextrins, particularly those made from cereal starches, such as corn starch, set-back or stiffen on standing after being cooked in high solids concentrations in water. Dextrins which set-back or stiffen much on standing are not suitable for such applications as envelope and postage stamp adhesives, since the viscosity of the cooked dextrin must be kept within rather narrow limits to insure proper functioning of the automatic machinery used in applying the adhesive to envelopes and stamps. They would also have a tendency to clog feed lines especially during periods when the machinery is shut down. Dextrins made from root starches, for example, tapioca starch, do not possess this characteristic to such a marked degree and have been preferred for use in such adhesives. We have found that the treatment of cereal starch dextrins with alkylene oxides by our present process reduces the tendency of the cooked dextrin to set-back or stiffen on standing.

If a sufficient proportion of ethylene oxide is reacted with corn dextrins, products are obtainable which are comparable to tapioca dextrins, with regard to their paste properties. Clearer films which have greater flexibility and less wrinkling on drying can be made with the dextrin products of our present process. Products can be made from corn dextrins by our present process which have the soluble and flow properties required by the Bureau of Printing and Engraving of the Treasury Department for use as an adhesive for gumming stamps.

EXAMPLE 1

Unmodified, powdered, corn starch containing approximately 10% moisture and 1% by weight of sodium chloride included in the granules is placed in a pressure tight reaction chamber equipped with means of agitation and temperature control. After evacuating the reaction chamber to a 28" vacuum, ethylene oxide is admitted in sufficient amount to maintain the pressure between 10 and 15 lbs. per sq. in. and the starch heated to 160° F. The starch is heated and agitated for 6 to 10 hours until 16% by weight of ethylene oxide has been added, and a partial vacuum is developed in the reaction chamber. The product obtained will have its granules intact and will gelatinize in water at 80° F. to form a relatively clear, smooth, and viscid paste, which will not gel or retrograde on standing.

EXAMPLE 2

Acid modified, thin boiling corn starch containing approximately 10% moisture and 0.5% by weight of NaCl included in the granules is placed in a pressuretight reaction chamber equipped with means of agitation and temperature control. This starch has a maximum viscosity of 148 gram-centimeters when measured in a Corn Industries Viscometer in an 8% dry basis concentration with a bath temperature of 92° C.

The procedure for this test is described in the Journal of Industrial and Engineering Chemistry, Analytical Edition, vol. 19, pp. 16–21; 1947.

After evacuating the reaction chamber to a 28 inch vacuum, ethylene oxide is admitted in sufficient amount to maintain the pressure between 10 and 15 lbs. per sq. in. and the starch heated to 160° F. The starch is heated and agitated for 6 to 10 hours until 16% by weight of ethylene oxide has been absorbed or combined with the starch. The product obtained will have its granules intact and will completely swell in water at 80° F. to yield a relatively clear, smooth, and fluid paste, which will not thicken or retrograde on standing.

EXAMPLE 3

Unmodified, powdered, tapioca starch containing approximately 10% moisture and .2% NaOH and 1% NaCl included in the granules is placed in a pressuretight vessel reaction chamber equipped with means of agitation and temperature control. After evacuating the reaction chamber to a 28 inch vacuum, ethylene oxide is admitted in sufficient amount to maintain the pressure between 10 and 15 lbs. per sq. inch and the starch heated to 160° F. The starch is heated and agitated until 14% by weight of ethylene oxide has been combined or absorbed by the starch. The product obtained will have its original granules intact and will swell in water at 80° F. to form a relatively clear, glutinous, and smooth paste.

EXAMPLE 4

Unmodified, powdered, corn starch containing approximately 10% moisture and 0.2% NaOH and 1% NaCl included in the granules is placed in a pressure-tight reaction chamber equipped with means of agitation and temperature control. After evacuating the reaction chamber to a 28 inch vacuum, propylene oxide is admitted in sufficient amount to maintain the pressure between 10 and 15 lbs. per sq. in. and the starch heated to 180° F. The starch is heated and agitated until 20% by weight of propylene oxide has been absorbed or combined with the starch. The product obtained will have its granules intact and will swell in water at 80° F. to form a smooth, viscid paste, which will not gel or retrograde on standing.

EXAMPLE 5

Unmodified corn starch is suspended in a 1% by weight sodium chloride solution, dewatered in a suction filter to a cake containing approximately 50% by weight of moisture and dried to approximately 5% by weight of moisture. The starch is then dextrinized with acid and heat to a canary type dextrin, about 95% soluble in water. The dextrin is allowed to absorb moisture until its moisture content is approximately 5% by weight. The dextrin is then reacted in the manner described in Example 2 for 2 to 5 hours until 5% by weight of ethylene oxide is added. The reacted dextrin will form a fluid paste when cooked in high solids concentrations in water and will have a greatly reduced tendency to set-back or stiffen on standing, as compared to the dextrin before treatment by our process.

EXAMPLE 6

The product obtained in Example 1 is converted to a canary type dextrin by any of the usual methods. For example, 1000 lbs. of the products obtained in Example 1 is acidified with two lbs. of commercial muriatic acid and roasted in the range of 300° to 350° F. until the desired properties are obtained to meet the soluble and flow specifications of the Bureau of Printing and Engraving of the U. S. Treasury Department for use as an adhesive for gumming stamps.

While in the foregoing specification, we have set forth certain examples in detail for the purpose of illustrating specific modes of applying the invention, it will be understood that such details may be widely varied by those skilled in the art without departing from the spirit of our invention.

We claim:

1. In a process of the character set forth, the steps of intimately dispersing from .1% to .5% by weight of soluble alkali in a material selected from the group consisting of an unswollen granule starch and a cereal starch dextrin and containing from 5% to 15% by weight of moisture, and then gradually bringing into contact with said material from 1% to 20% by weight of a monofunctional epoxide of a lower aliphatic hydrocarbon in which the oxygen is linked to adjacent carbon-hydrogen groups at such a rate that no large excess of unreacted epoxide is present at any time and agitating the mixture in a closed zone until substantially no free epoxide remains.

2. The process of claim 1 in which the monofunctional epoxide is ethylene oxide.

3. The process of claim 1 in which the monofunctional epoxide is 1,2 epoxy-propane.

4. In a process of the character set forth, the steps of intimately dispersing from .1% to 5.0% by weight of a water soluble salt selected from the group consisting of the salt of an alkali metal and an alkaline earth metal in a material selected from a group consisting of unswollen, granule starch and a cereal starch dextrin and containing from 5% to 15% by weight of moisture, and then gradually bringing into contact with said material from 1% to 20% by weight of a monofunctional epoxide of a lower aliphatic hydrocarbon in which the oxygen is linked to adjacent carbon-hydrogen groups at such a rate that no large excess of unreacted epoxide is present at any time, and agitating the mixture in a closed zone until substantially no free epoxide remains.

5. The process of claim 4 in which there is added to the salt from .1% to .5% of soluble alkali by weight of material selected from a group consisting of unswollen, granule starch and a cereal starch dextrin.

6. In a process of the character set forth, the steps of intimately dispersing from .1% to .5% of soluble alkali in unswollen, granule starch containing from 5% to 15% by weight of moisture, and then gradually bringing into contact with said starch from 1% to 20% by weight of a monofunctional epoxide of a lower aliphatic hydrocarbon in which the oxygen is linked to adjacent carbon-hydrogen groups at such a rate that no large excess of unreacted epoxide is present at any time, and agitating the mixture in a closed zone until substantially no free epoxide remains.

7. In a process of the character set forth, the steps of intimately dispersing from .1% to 5.0% of a water-soluble salt selected from the group consisting of the salt of an alkali metal and an alkaline earth metal in unswollen granule starch containing from 5% to 15% by weight of moisture, and then gradually bringing into contact with said starch from 1% to 20% by weight of a monofunctional epoxide of a lower aliphatic hydrocarbon in which the oxygen is linked to adjacent carbon-hydrogen groups at such a rate that no large excess of unreacted epoxide is present at any time, and agitating the mixture in a closed zone until substantially no free epoxide remains.

8. In a process of the character set forth, the steps of intimately dispersing from .1% to .5% by weight of soluble alkali and from .1% to 5.0% by weight of a water soluble salt selected from the group consisting of the salt of an alkali metal and an alkaline earth metal in unswollen granule starch containing from 5% to 15% by weight of moisture, and then gradually bringing into contact with said starch from 1% to 20% by weight of a monofunctional epoxide of a lower aliphatic hydrocarbon, in which the oxygen is linked to adjacent carbon groups, at such a rate that no large excess of unreacted epoxide is present at any time, and agitating the mixture in a closed zone until substantially no free epoxide remains.

9. In a process of the character set forth, the steps of adding to a water suspension of unswollen, granule starch an amount of a salt selected from the group consisting of a salt of an alkali metal and an alkaline earth metal sufficient to result in a proportion of from .1% to 5.0% by weight of salt remaining in the starch on dewatering, then dewatering the starch to a moisture content of from 5% to 15% by weight, gradually bringing into contact with said starch from 1% to 20% by weight of a monofunctional epoxide of a lower aliphatic hydrocarbon in which the oxygen is linked to adjacent carbon-hydrogen groups at such a rate that no large excess of unreacted epoxide is present at any time, and agitating the mixture in a closed zone until substantially no free epoxide remains.

10. The process of claim 9 in which the monofunctional epoxide is ethylene oxide.

11. The process of claim 9 in which the monofunctional epoxide is 1,2 epoxy propane.

12. In a process of the character set forth, the steps of adding to a water suspension of unswollen, granule starch from .1% to .5% by weight of water-soluble alkali based on starch solids, then dewatering the starch to a moisture content of from 5% to 15% by weight, gradually bringing into contact with said starch from 1% to 20% by weight of a monofunctional epoxide of a lower aliphatic hydrocarbon in which the oxygen is linked to adjacent carbon-hydrogen groups at such a rate that no substantial excess of unreacted epoxide is present at any time, and agitating the mixture in a closed zone until substantially no free epoxide remains.

13. In a process of the character set forth the steps of adding to a water suspension of unswollen granule starch from .1% to .5% by weight of water soluble alkali based on starch solids, and an amount of a water soluble salt selected from a group consisting of the salt of an alkali metal and an alkaline earth metal sufficient to result in a proportion of from .1% to 5.0% by weight of said salt remaining in the starch on dewatering, then partially dewatering the starch, drying the starch to a moisture content of from 5% to 15% by weight, bringing into contact with said starch from 1% to 20% by weight of a monofunctional epoxide of a lower aliphatic hydrocarbon in which the oxygen is linked to adjacent carbon-hygrogen groups whereby no substantial excess of unreacted epoxide is present at any time, and agitating the mixture in a closed zone until substantially no free epoxide remains.

14. In a process of the character set forth the steps of adding to a water suspension of unswollen, granule starch an amount of a salt selected from the group consisting of a salt of an alkali metal and an alkaline earth metal sufficient to result in a proportion of from .1% to 5.0% by weight of salt remaining in the starch on dewatering, then dewatering the starch to a moisture content of from 5% to 15% by weight, gradually bringing into contact with said starch from 1% to 20% by weight of a monofunctional epoxide of a lower aliphatic hydrocarbon in which the oxygen is linked to adjacent carbon-hydrogen groups at such a rate that no large excess of unreacted epoxide is present at any time, agitating the mixture in a closed zone until substantially no free epoxide remains, and heating the product with acid to dextrinize the starch.

15. In a process of the character set forth, the steps of intimately dispersing from .1% to .5% by weight of soluble alkali in a cereal starch dextrin leaving a moisture content of from 5% to 15%, gradually bringing into contact with said dextrin from 1% to 20% by weight of a monofunctional epoxide of a lower aliphatic hydrocarbon in which the oxygen is linked to adjacent carbon-hydrogen groups at such a rate that no substantial excess of unreacted epoxide is present at any time, and agitating the mixture in a closed zone until substantially no free epoxide remains.

16. In a process of the character set forth, the steps of intimately dispersing from .1% to .5% by weight of soluble alkali in an unswollen, granule cereal starch leaving a moisture content of from 5% to 15%, gradually bringing into contact with said starch from 1% to 20% by weight of a monofunctional epoxide of a lower aliphatic hydrocarbon in which the oxygen is linked to adjacent carbon-hydrogen groups at such a rate that no substantial excess of unreacted epoxide is present at any time, agitating the mixture in a closed zone until substantially no free epoxide remains, and heating the product with acid to dextrinize the starch.

17. In a process of the character set forth, the steps of intimately dispersing from .1% to 5.0% by weight of a water-soluble salt selected from the group consisting of a salt of an alkali metal and an alkaline earth metal in a cereal starch dextrin leaving a moisture content of from 5% to 15%, gradually bringing into contact with said dextrin from 1% to 20% by weight of a monofunctional epoxide of a lower aliphatic hydrocarbon in which the oxygen is linked to adjacent carbon-hydrogen groups at such a rate that no substantial excess of unreacted epoxide is present at any time, and agitating the mixture in a closed zone until substantially no free epoxide remains.

18. In a process of the character set forth, the steps of heating starch in which is intimately dispersed from .1% to 5.0% of a water-soluble salt selected from the group consisting of the salt of an alkali metal and an alkaline earth metal in the presence of an acid to form a dextrin, bringing the moisture content of said dextrin to 5% to 15% by weight, gradually bringing into contact with said dextrin from 1% to 20% by weight of a monofunctional epoxide of a lower aliphatic hydrocarbon at such a rate that no large excess of unreacted epoxide is present at any time, and agitating the mixture in a closed zone until substantially no free epoxide remains.

19. A starch product comprising a reaction product of unswollen starch in its original granule form and 1% to 20% by weight of a monofunctional epoxide of a lower aliphatic hydrocarbon in which the oxygen is linked to adjacent carbon-hydrogen groups, said product prepared in accordance with the process set forth in claim 1.

20. A starch product comprising a reaction product of unswollen starch in its original granule form and 1% to 20% by weight of a monofunctional epoxide of a lower aliphatic hydrocarbon in which the oxygen is linked to adjacent carbon-hydrogen groups, said product prepared in accordance with the process set forth in claim 4.

21. A starch product comprising a reaction product of unswollen starch in its original granule form and 1% to 20% by weight of a monofunctional epoxide of a lower aliphatic hydrocarbon in which the oxygen is linked to adjacent carbon-hydrogen groups, said product prepared in accordance with the process set forth in claim 5.

22. A starch product comprising a reaction product of unswollen starch in its original granule form and 5% to 20% of a monofunctional epoxide of a lower aliphatic hydrocarbon in which the oxygen is linked to adjacent carbon-hydrogen groups, said product prepared in accordance with the process set forth in claim 1.

23. A starch product comprising a reaction product of unswollen starch in its original granule form and 5% to 20% of a monofunctional epoxide of a lower aliphatic hydrocarbon in which the oxygen is linked to adjacent carbon-hydrogen groups, said product prepared in accordance with the process set forth in claim 4.

24. A starch product comprising a reaction product of unswollen starch in its original granule form and 5% to 20% of a monofunctional epoxide of a lower aliphatic hydrocarbon in which the oxygen is linked to adjacent carbon-hydrogen groups, said product prepared in accordance with the process set forth in claim 5.

25. A material comprising a reaction product of a cereal starch dextrin and from 1% to 20% by weight of a monofunctional epoxide of a lower aliphatic hydrocarbon in which the oxygen is linked to adjacent carbon-hydrogen groups, said product prepared in accordance with the process set forth in claim 17.

26. A product comprising the acid degradation product of cereal starch reacted with from 1% to 20% by weight of a monofunctional epoxide of a lower aliphatic hydrocarbon in which the oxygen is linked to adjacent carbon-hydrogen groups, said product prepared in accordance with the process set forth in claim 14.

CARL C. KESLER.
ERLING T. HJERMSTAD.

REFERENCES CITED

The following references are of record in the file of this patent:

UNITED STATES PATENTS

| Number | Name | Date |
|---|---|---|
| 2,116,867 | Kreimeier et al. | May 10, 1938 |